United States Patent
Riedel et al.

(10) Patent No.: US 9,924,214 B2
(45) Date of Patent: Mar. 20, 2018

(54) DEVICE, SYSTEM, AND METHOD FOR SCHEDULED AVAIL TONE VALIDATION

(71) Applicant: VIACOM INTERNATIONAL INC., New York, NY (US)

(72) Inventors: Gregg William Riedel, New York, NY (US); Christopher Fulton Hundersmarck, New York, NY (US); Scott Charles Findling, New York, NY (US); Michael J. McMackin, New York, NY (US)

(73) Assignee: VIACOM INTERNATIONAL INC., New York, NY (US)

(*) Notice: Subject to any disclaimer, the term of this patent is extended or adjusted under 35 U.S.C. 154(b) by 11 days.

(21) Appl. No.: 14/862,657

(22) Filed: Sep. 23, 2015

(65) Prior Publication Data
US 2017/0085935 A1    Mar. 23, 2017

(51) Int. Cl.
| | |
|---|---|
| H04N 21/234 | (2011.01) |
| H04N 21/262 | (2011.01) |
| H04H 20/14 | (2008.01) |
| H04N 21/24 | (2011.01) |

(52) U.S. Cl.
CPC ...... *H04N 21/26258* (2013.01); *H04H 20/14* (2013.01); *H04N 21/23424* (2013.01); *H04N 21/2407* (2013.01)

(58) Field of Classification Search
CPC .................. H04N 21/26258; H04N 21/23424
See application file for complete search history.

(56) References Cited

U.S. PATENT DOCUMENTS

| | | | |
|---|---|---|---|
| 6,986,153 B1 | 1/2006 | Ridderheim et al. | |
| 7,627,878 B2* | 12/2009 | Pouliot | H04H 20/14 725/22 |
| 8,341,550 B2* | 12/2012 | de Heer | H04N 21/23424 705/14.4 |
| 8,818,864 B2 | 8/2014 | Wiles | |
| 8,966,527 B1 | 2/2015 | Godwin | |
| 2002/0104083 A1* | 8/2002 | Hendricks | H04H 20/10 725/34 |
| 2002/0144262 A1* | 10/2002 | Plotnick | G11B 27/005 725/32 |
| 2003/0126613 A1* | 7/2003 | McGuire | G06F 11/321 725/109 |
| 2008/0222672 A1 | 9/2008 | Piesing | |
| 2010/0162288 A1* | 6/2010 | Huffman | H04H 20/14 725/22 |
| 2011/0102600 A1* | 5/2011 | Todd | H04N 17/004 348/180 |
| 2012/0116855 A1 | 5/2012 | Millar | |

(Continued)

*Primary Examiner* — Brian T Pendleton
*Assistant Examiner* — Frank Johnson-Calderon
(74) *Attorney, Agent, or Firm* — Fay Kaplun & Marcin, LLP (57) ABSTRACT

An avail comparator and method validates scheduled avail tones. The method includes receiving an automation playlist indicating at least one scheduled avail tone configured to be included in a broadcast. The method includes receiving a feed corresponding to the broadcast. The method includes receiving a signaling for each of the at least one scheduled avail tone based upon the automation playlist. The method includes determining whether the at least one scheduled avail tone was triggered in the broadcast based upon the corresponding signaling.

20 Claims, 3 Drawing Sheets

(56) References Cited

U.S. PATENT DOCUMENTS

| | | | |
|---|---|---|---|
| 2012/0173342 A1* | 7/2012 | Rajaopadhye | G06Q 30/0272 705/14.68 |
| 2014/0282657 A1 | 9/2014 | Sinha et al. | |
| 2015/0341812 A1* | 11/2015 | Dion | H04W 24/08 370/252 |

* cited by examiner

Fig. 3

DEVICE, SYSTEM, AND METHOD FOR SCHEDULED AVAIL TONE VALIDATION

BACKGROUND INFORMATION

A television broadcast may be delivered from a broadcaster to a distributor and ultimately to a consumer. Accordingly, a broadcast system may entail a first transmission of the television broadcast from the source to an intermediary which may perform a second transmission of the television broadcast from the intermediary to the viewer. This broadcast system may enable alternate programming such that the distributor may insert programming segments in predetermined available slots within the television broadcast. For example, the distributor may perform the second transmission for a local area and may insert the programming segment in the available slot targeted at the audience of the local area.

The broadcaster may utilize an automated process to indicate to the distributor when in the television broadcast alternate programming may be substituted. Specifically, a digital signal, audible or inaudible cue tone or an avail tone may be inserted into the broadcast signal in the first transmission from the broadcaster to the distributor. Accordingly, when the distributor receives or identifies the inclusion of the avail tone, the distributor may, under its discretion, replace the available slot with a selected programming segment such that the local area corresponding to the distributor is provided the selected programming segment.

The broadcast system where the broadcaster inserts signaling such as avail tones includes feedback loops to verify several aspects of the television broadcast. Specifically, the feedback loop may be from a communication medium used in the first transmission. The aspects that may be checked using the feedback loops include a quality of the video and/or audio. Furthermore, the feedback loop may validate whether the avail tone has been embedded properly such as being properly translated and subsequently transmitted and received back. Although this feedback loop may indicate when a detected avail tone has been inserted and transmitted properly, there are inadvertent errors that may occur which are undetectable using conventional validation mechanisms.

SUMMARY

The present invention is directed to a method comprising: at an avail comparator: receiving an automation playlist indicating at least one scheduled avail tone configured to be included in a broadcast; receiving a feed corresponding to the broadcast; receiving a signaling for each of the at least one scheduled avail tone based upon the automation playlist; and determining whether the at least one scheduled avail tone was triggered in the broadcast based upon the corresponding signaling.

The present invention is directed to an avail comparator comprising: a transceiver configured to establish a connection to a broadcast system; and a processor configured to receive an automation playlist indicating at least one scheduled avail tone configured to be included in a broadcast, the processor configured to receive a feed corresponding to the broadcast, the processor configured to receive a signaling for each of the at least one scheduled avail tone based upon the automation playlist, the processor configured to determine whether the at least one scheduled avail tone was triggered in the broadcast based upon the corresponding signaling.

The present invention is directed to a non-transitory computer readable storage medium with an executable program stored thereon, wherein the program instructs a microprocessor to perform operations comprising: receiving an automation playlist indicating at least one scheduled avail tone configured to be included in a broadcast; receiving a feed corresponding to the broadcast; receiving a signaling for each of the at least one scheduled avail tone based upon the automation playlist; and determining whether the at least one scheduled avail tone was triggered in the broadcast based upon the corresponding signaling.

DETAILED DESCRIPTION

The exemplary embodiments may be further understood with reference to the following description and the related appended drawings, wherein like elements are provided with the same reference numerals. The exemplary embodiments are related to a device, system, and method for validating signaling in a broadcast. Specifically, the exemplary embodiments provide a mechanism to validate the signaling earlier upstream in the transmission procedure where the signaling may be time or playlist sensitive. The exemplary embodiments also provide a mechanism to validate that signaling that have been scheduled in an automation playlist are played out so that the indication is properly received. The signaling, the broadcast, the validation, the transmission procedure, the scheduling, and a related method will be described in further detail below.

Initially, it is noted that the exemplary embodiments are described herein with reference to a television broadcast and the use of signaling as indicators. However, those skilled in the art will appreciate that the exemplary embodiments may be used with any transmission procedure in which an indicator (e.g., digital signaling, audio, visual, etc.) is inserted in the transmission. For example, a radio broadcast may be a transmission that also uses signaling as indicators. In another example, there may be non-linear broadcasts such as streaming audio or video, podcasts, etc. that may also use signaling. Thus, the television broadcast may represent any transmission and the signaling may represent any indicator that is inserted, particularly at predetermined scheduled times in the transmission.

Figure 1:
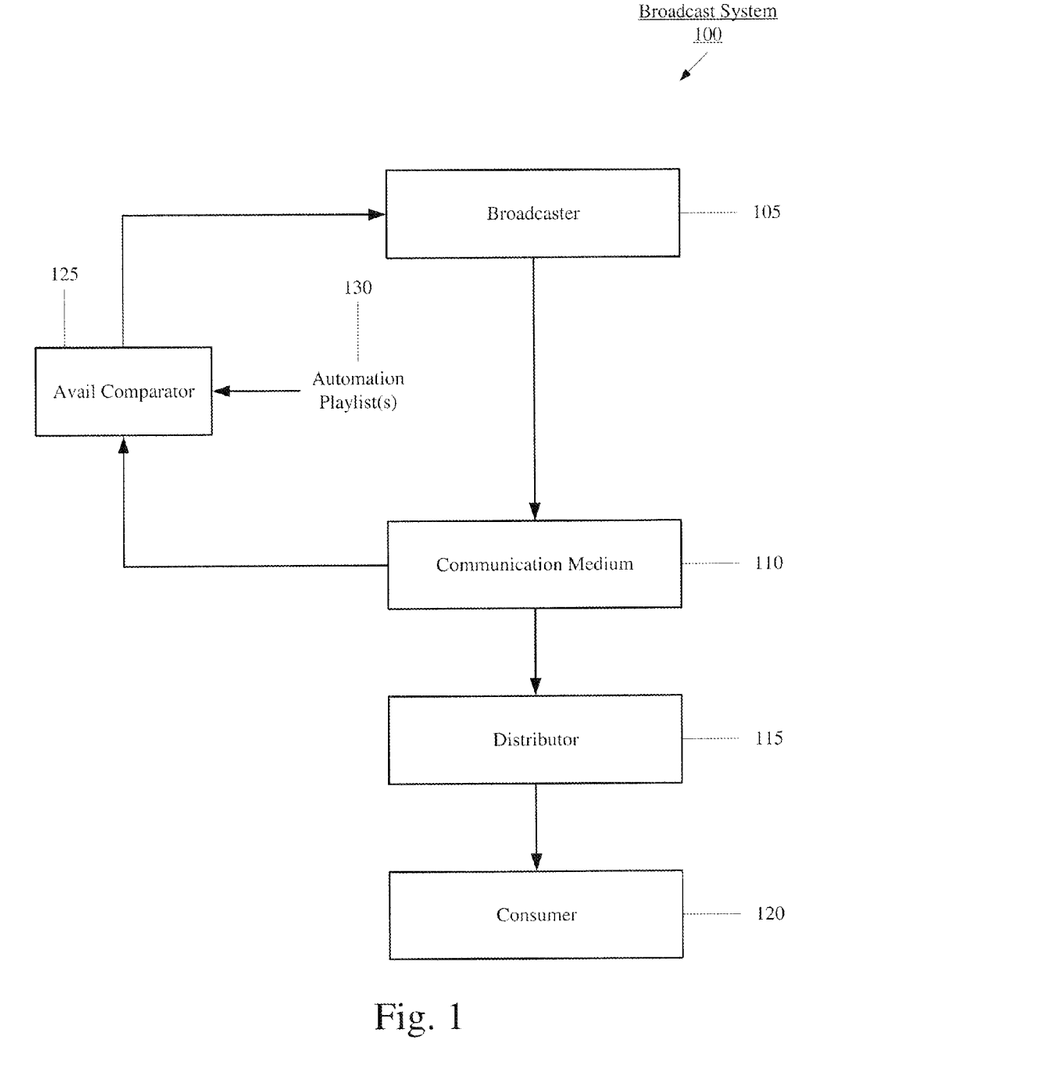
FIG. 1 shows a broadcast system according to the exemplary embodiments.

FIG. 1 shows a broadcast system 100 according to the exemplary embodiments. The broadcast system 100 relates to a transmission procedure. Specifically, the broadcast system 100 may be used for a television broadcast. The broadcast system 100 may include an automated feature that enables the television broadcast to be provided for a further transmission to end display devices. The broadcast system 100 may include a broadcaster 105, a communication medium 110, a distributor 115, and a consumer 120. According to the exemplary embodiments, the broadcast system 100 may further include an avail comparator 125.

The broadcaster 105 may be any source from which a television broadcast originates. For example, the broadcaster 105 may produce or provide a show for broadcast. An example of a broadcaster 105 may be Viacom International Inc. of New York, N.Y. that produces shows for its networks including, for example, Nickelodeon, MTV, Comedy Central, etc. Accordingly, when the transmission is a television broadcast, the broadcaster 105 may be a television network that represents an organization or entity that provides live or prerecorded content to television stations for distribution.

The television broadcast may be transmitted from the broadcaster 105 using a variety of different manners. That is, via the communication medium 110, the television broadcast may be transmitted. The communication medium 110 may be any transmission mode such as a satellite communication, a fiber communication, etc. The communication medium 110 may utilize any wired or wireless communication mechanism for the broadcaster 105 to transmit the television broadcast. Furthermore, the communication medium 110 may utilize a network architecture such that the television broadcast may be transmitted by the broadcaster 105 to a destination component of the broadcast system 100 in a direct or indirect route as well as to one or more destination components.

Through the communication medium 110, the broadcaster 105 may transmit the television broadcast to the distributor 115. The distributor 115 may be an intermediary that retransmits the television broadcast, particularly for a geographic region for which the distributor 115 is associated. The television broadcast may be re-transmitted with selected alterations at allowed time lots within the broadcast. It should be noted that if no alteration is made, a predetermined programming segment may be played out in the time slot as was included in the television broadcast that was received.

The distributor 115 may include a variety of different entities or components. For example, the distributor 115 may be a multichannel video programming distributor (MVPD) which is a service provider delivering the television broadcasts received from the broadcaster 105. The MVPD may include satellite based systems such as being a direct broadcast satellite provider, cable based systems such as a cable television provider, a wireline based system such as a fiber optic provider, etc. In another example, the distributor 115 may be a multiple-system operator (MSO) which is a service provider delivering the television broadcasts received from the broadcaster 105 using multiple cable or direct broadcast satellite television systems. In a further example, the distributor 115 may be an affiliate station which is a local broadcaster of the television broadcasts received from the broadcaster 105, often independent of the broadcaster 105.

Using any communication mechanism, the distributor 115 may re-transmit the television broadcast to the consumer 120. The consumer 120 may be an end display device that shows video and/or plays audio associated with the television broadcast. The communication mechanism by which the distributor 115 retransmits the television broadcast to the consumer 120 may be based upon the available mechanisms utilized by the distributor 115. For example, the communication mechanism may include a satellite based system, a fiber based system, or a cable based system. Generally, the consumer 120 has subscribed as a member with the distributor 115 and therefore has the appropriate components or devices by which the communication mechanism may be utilized for proper delivery of the television broadcasts.

It should be noted that the broadcast system 100 illustrated in FIG. 1 may include a plurality of further components. For example, there may be further broadcasters 105 that provide television broadcasts. Accordingly, there may be another broadcaster (not shown) in the broadcast system 100 that uses the communication medium 110 to transmit the television broadcast to the distributor 115. In another example, there may be further distributors 115 that receive the television broadcasts from the broadcaster 105. Accordingly, there may be one or more distributors 115 that utilize the communication medium 110 to receive the television broadcast from the broadcaster 105. In yet another example, there may be one or more consumers 120 or end devices that ultimately receive the transmission of the television broadcast from the distributor 115. In this manner, there may be a plurality of broadcasters 105 that each provide a television broadcast to a plurality of distributors 115 via any known communication medium 110 that each provide the television broadcast to a plurality of consumers 120.

In the broadcast system 100, the broadcaster 105 may utilize a device that inserts cue tones, avail tones, or other audio, video or digital signaling mechanisms (hereinafter collectively or individually referred to as "avail tones") to signify to the distributor 115 that a programming segment such as an advertisement or a promotion may be replaced at the discretion of the distributor 115 with local advertising or other content. As discussed above, the distributor 115 may provide television broadcasts for a geographic location such that local advertising may be used by local vendors. This may be the mechanism by which viewers in local markets receive advertisements that are geographically relevant (e.g., a local advertisement may be played instead of a national or regional advertisement). Again, if the distributor 115 does not utilize this feature, a nationwide or generic programming segment may be used as was originally included in the television broadcast by the broadcaster 105. Therefore, when the distributor 115 intends to utilize this feature of including local programming segments, the avail tones may provide the indication of when there are available slots within the broadcast.

The avail tones may be one or more audio tones or digital signals that constitute a message to prompt the distributor 115 of the availability for inserting a programming segment. When related to the broadcast system 100, the avail tones may specifically be a dual-tone multi-frequency signaling (DTMF) tone, a subaudible tone, or a purely digital signal (e.g., within MPEG metadata). The avail tones may also include a first tone indicating a start location in the broadcast and a second tone indicating an end location in the broadcast for which the programming segment is allowed to be inserted. Therefore, when properly embedded or inserted into the television broadcast, the broadcaster 105 may automatically provide an indication to the distributor 115.

The broadcaster 105 may also utilize a monitoring feature to ensure that the television broadcast is being properly transmitted and provided to the distributor 115 and ultimately the consumer 120. Furthermore, because the feature of inserting the avail tones into the television broadcast is important for the broadcaster 105, the distributor 115, and the consumer 120, the broadcaster 105 may utilize the monitoring feature for the avail tones as well. Accordingly, via the communication medium 110, a return feed may be provided to the broadcaster 105. Although the broadcast system 100 according to the exemplary embodiments illustrates a single return feed that bypasses the avail comparator 125, the return feed from the communication medium 110 may be directly fed back to the broadcaster 105 (not shown) or indirectly fed through the avail comparator 125. It should be noted that the return feed being provided by the communication medium 110 is only exemplary. In other scenarios, the return feed may be provided back to the broadcaster 105 by any subsequent component that receives the television broadcast (e.g., the distributor 115).

The return feed that is received by the broadcaster 105 from the communication medium 110 may therefore be used to monitor a variety of indicators including a video and audio quality of the television broadcast being provided by the broadcaster 105. The return feed may also be used to determine whether or not the avail tones were embedded properly. Specifically, the broadcaster 105 may monitor that the avail tones are translated properly. For example, the translation may include translating from various types of signals such as an analog signal (e.g., DTMF or subaudible), a digital signal (e.g., Society of Cable Television Engineers (SCTE) 104), general purpose interface (GPI) closures, etc. to a different type of signal such as SCTE-35. The broadcaster 105 may also monitor that the avail tones are sent out properly in the transmission to the communication medium 110 and received back properly from the communication medium 110.

Although the broadcaster 105 may utilize a mechanism that the avail tone has been sent out and received back properly, this verification measurement is limited to whether the avail tone has been embedded. That is, the broadcaster 105 may be incapable of automatically validating that a scheduled avail tone has aired correctly. The above described monitoring mechanism does not provide a way of knowing that a scheduled avail tone has been triggered properly. When the avail tone is not triggered, this leads to extended outages where revenue is lost. For example, the avail tone may have been scheduled properly but an equipment failure may have occurred where the signal to insert the avail tone is not received properly by the insertion equipment/subsystem. This scenario may not be determined to be an error by the above described monitoring mechanisms. Conventionally, the actual determination for whether the avail tones are triggered involves a tedious manual confirmation by master control operators. Specifically, this is performed manually by these operators by reviewing logs which may be useful for long-term forensic analysis but inefficient and impractical for short-term purposes such as related to the functionalities to be described below for the exemplary embodiments.

Accordingly, the exemplary embodiments provide a mechanism to validate avail tone functionality earlier upstream in the transmission procedure of the television broadcast than previously performed. Specifically, the exemplary embodiments utilize the avail comparator 125 to provide this validation functionality. As noted above, the avail comparator 125 may be positioned in the broadcast system 100 so that the return feed is received by the avail comparator 125. Accordingly, results of the analysis performed by the avail comparator 125 may be provided to the broadcaster 105 (as well as the return feed itself). As will be described in further detail below, the avail comparator 125 may determine scheduled avail tones in a broadcast automation playlist with avail tones received in the return feed for monitoring and alerting purposes.

Initially, avail tones may be delivered using a variety of different mechanisms. Those skilled in the art will understand that each of these avail tone delivery mechanisms has advantages and disadvantages. Specifically, each of these avail tone delivery mechanisms may have their own failure mode. For example, the circumstances for the failure modes may include failure of a Evertz 7721dd4+GPI card, a DENIS computer, a NMX computer, a communication between DEMS or NMX and the encoder chassis, a configuration issue with an uplink encoder, a proper receiving/decoding of the SCTE-35 message by the IRD that was ultimately generated from the GPI/SCTE 104 input, etc. The exemplary embodiments are configured to operate independently of these failures and still provide the functionalities described below for monitoring and alerting purposes.

Figure 2:
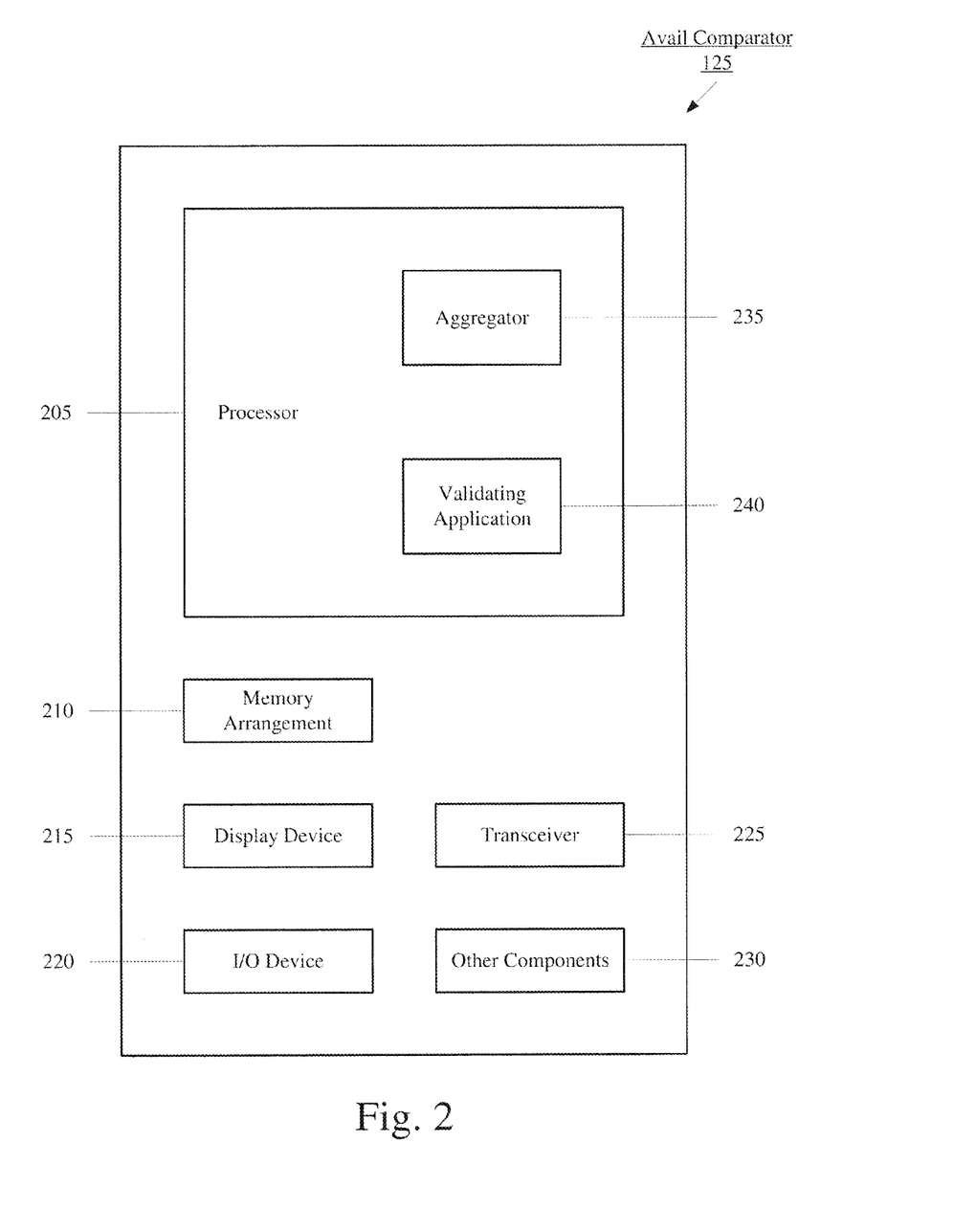
FIG. 2 shows an avail comparator of the broadcast system of FIG. 1 according to the exemplary embodiments.

FIG. 2 shows an avail comparator 125 of the broadcast system 100 of FIG. 1 according to the exemplary embodiments. The avail comparator 125 may be any component configured to perform the functionalities to be described in further detail below. For example, the avail comparator 125 may be a wired or wireless device that receives the information and transmits results of an analysis. It should be noted that the avail comparator 125 being a separate component is only exemplary. As those skilled in the art will understand, in another exemplary embodiment, the avail comparator 125 may be an integrated component of the broadcaster 105. The avail comparator 125 may include a processor 205, a memory arrangement 210, a display device 215, an input/output (I/O) device 220, a transceiver 225, and other components 230.

The processor 205 may be configured to execute a plurality of applications of the avail comparator 125. For example, the processor 205 may execute an aggregator 235 that is configured to aggregate the return feed from the communication medium 110 prior to being processed. Specifically, the avail comparator 125 according to the exemplary embodiments is configured to analyze a plurality of return feeds from the various different communication mediums to verify that the avail tones are properly inserted and embedded in the television broadcast. As such, the aggregator 235 may combine the individual return feeds to generate a combined return feed for analysis. However, it should be noted that the use of the aggregator 235 is only exemplary and the avail comparator 125 may process each of the return feeds with or without aggregation. It should also be noted that the aggregator 235 being an integrated component and/or an application executed by the processor 205 of the avail comparator 125 is only exemplary. That is, the aggregator 235 may be an intermediary component that receives the return feed from the plurality of communication mediums 110 and aggregates them prior to delivery to the avail comparator 125.

In another example, the avail comparator 125 may execute a validating application 240. The validating application 240 may be configured to determine whether the scheduled avail tones as indicated in an automation playlist 130 received by the avail comparator 125 has been triggered and likely to have been properly received by the distributor 115. As will be described in further detail below, the automation playlist 130 may be received from an administrator through a manual entry, from the broadcaster 105, or through another mechanism that is capable of providing the automation playlist 130. The validating application 240 may also receive the return feed that may include information regarding whether avail tones have been triggered. Accordingly, the validating application 240 may determine whether or not scheduled avail tones have been triggered.

It should be noted that the above noted applications, each being an application (e.g., a program) executed by the processor 205, is only exemplary. The functionality associated with the applications may also be represented as a separate incorporated component of the avail comparator 125 or may be a modular component coupled to the avail comparator 125, e.g., an integrated circuit with or without firmware.

The memory 210 may be a hardware component configured to store data related to operations performed by the avail comparator 125. Specifically, the memory 210 may store data related to the aggregator 235 and the validating application 240. For example, the memory 210 may store the various return feeds (at least temporarily) for the aggregator 235 to perform its functionality. In another example, the memory 210 may store the automation playlist 130 for use during the analysis.

The display device 215 may be a hardware component configured to show data to a user while the I/O device 220 may be a hardware component that enables the user to enter inputs. For example, the display device 215 may enable a user such as an administrator to view a progress of the analysis of the validating application 240 as well as any results that are determined. It should be noted that the display device 215 and the I/O device 220 may be separate components or integrated together such as a touchscreen. The transceiver 225 may be a hardware component configured to transmit and/or receive data in a wired or wireless manner. The transceiver 225 may operate on a variety of different frequencies or channels (e.g., set of consecutive frequencies) that are related to the functionalities of the different applications being performed. Specifically, the transceiver 225 may enable a communication pathway in which the return feed is received from the communication medium 110 and to transmit the return feed and results of an analysis by the validating application 240 to the broadcaster 105.

As noted above, the automation playlist 130 may be a scheduling of avail tones that are predetermined to be triggered in the television broadcast transmitted by the broadcaster 105. Accordingly, the automation playlist 130 may indicate the available time slots during the television broadcast where the distributor 115 may insert programming segments at its discretion. The available time slots may be determined manually by an administrator or programming director and entered into the automation playlist 130. Because the automation playlist 130 is a predetermined scheduling of the available time slots, the automation playlist 130 may also include the scheduling of the avail tones. The automation playlist 130 may further be used to provide a signal for when the avail tones in the automation playlist 130 are played out as scheduled in the television broadcast, as determined from the return feed of the television broadcast.

As discussed above, the avail comparator 125 may receive a plurality of return feeds. The plurality of return feeds may be for a single television broadcast transmitted over different communication mediums 110. However, the plurality of return feeds may also be for a plurality of different television broadcasts. Accordingly, each unique television broadcast may have an associated automation playlist 130. However, it should be noted that this association is only exemplary. In other exemplary embodiments, each unique television broadcast using a unique communication medium may also have an associated automation playlist 130 or a generic automation playlist 130 may be used for every television broadcast originating from the broadcaster 105 (e.g., every first 30 second interval during a two minute time slot in the television broadcast). The avail comparator 125 may receive each of these automation playlists 130 (e.g., via the I/O device 220).

When the automation playlist 130 is received, the validating application 240 may determine when the avail tones are scheduled to be triggered for the television broadcast. Specifically, by receiving the return feed corresponding to the television broadcast, the validating application 240 may determine whether the scheduled avail tones as indicated in the automation playlist 130 have been properly triggered during the broadcast. The validating application 240 may specifically perform the validating functionality by receiving an indication or signaling of when a scheduled avail tone has played out based upon the automation playlist 130 and subsequently receiving a corresponding notification from the return feed within a predetermined amount of time. The predetermined time in which the notification is to be received may be selected by an administrator and/or determined based upon a variety of factors such as a compensation for transmitting the television broadcast, receiving the return feed, adjusting for expected delays, etc.

The predetermined amount of time in which to receive the corresponding notification may be any predefined amount of time subsequent to the time that the scheduled avail tone is to play out. The predetermined amount of time may also be utilized in a different manner. Specifically, the automation playlist 130 for a given channel or broadcast may include a window of opportunity in which the scheduled avail tone is to play out. For example, a particular channel may have three avail tones that are played out in a given hour (e.g., between the 14th and 32nd minute in the hour, between the 34th and 52nd minute in the hour, and between the 46th minute in the hour and the 4th minute after the hour). The validating application 240 may determine whether the scheduled avail tone played out if the corresponding signaling is detected outside these windows of opportunity or missed from within these windows of opportunity.

The signaling of the playout of an avail tone in the automation playlist 130 may utilize different mechanisms to indicate the playout to the validating application 240. In a first example, the signaling may be generated by incorporating a mechanism within a device driver that signals playouts of an avail tone on an on-air (focused) channel. This signaling may be a simple network management protocol (SNMP), an insertion of a database record, a proprietary protocol, a standards-based protocol, etc. between the playout system and the avail comparator 125. In a second example, the signaling may be generated by an external system (e.g., a facility management device) that scrapes the automation playlist 130 at play time looking for a playout of the avail tones to signal to the avail comparator 125 when the playout of the avail tones have occurred. In a third example, the signaling may be generated by the avail comparator 125 via a further application that scrapes the automation playlist 130 of avail tones and records them internally for later comparison with the notification of an avail tone as included in the return feed. Those skilled in the art will understand that the above-described exemplary embodiments may be implemented alone or in any combination.

The indication provided in the return feed may be determined based upon any known mechanism. For example, the return feed is substantially the same as the television broadcast that was transmitted from the broadcaster 105. Accordingly, the return feed that is received may have the avail tones triggered using known mechanisms to determine whether a corresponding notification is generated. Therefore, the validating application 125 may be capable of determining that a scheduled avail tone as indicated in the automation playlist 130 (as determined from the signaling of the playout of the avail tone) has been triggered in the television broadcast from the broadcaster 105 using a corresponding notification in the return feed within the predetermined time. The validating application 125 may also be capable of determining that the scheduled avail tone has been missed to generate an alert to indicate to a user of this error. In this manner, missed triggering of avail tones may still be determined when other monitoring mechanisms would bypass this error as it is undetectable.

The exemplary embodiments may further incorporate further features. In a first example, the validating application 240 or a further application may be configured with a logging functionality and/or a trending functionality. These functionalities may generate a searchable log of all activity performed by the avail comparator 125 for a configurable amount of time (e.g., a set number of days) with options including filtering by a date range, a channel, an avail tone status (e.g., triggered properly or missed), etc. In a second example, the exemplary embodiments may extend to incorporate other signaling in addition to the avail tones such as any SCTE 104 generated event (e.g., web blackout, multi-platform placement opportunity, etc.), an application for GPI signaling, comparing 5.1 GPI triggers to a received AC3 mode for traditional playout systems not using internal AC3 encoders, other signaling including AFD and V-Chip, etc.

Figure 3:
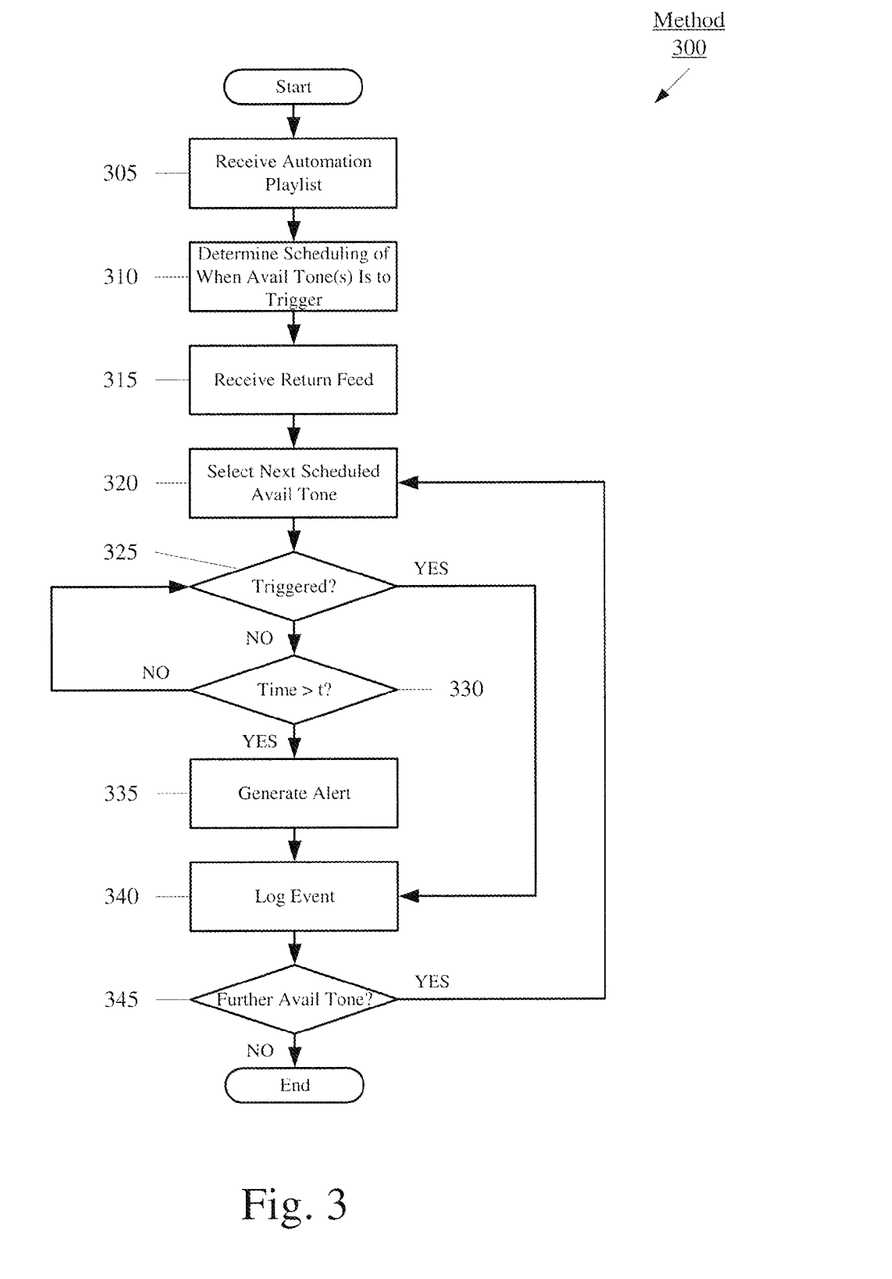
FIG. 3 shows a method for validating scheduled avail tones according to the exemplary embodiments.

FIG. 3 shows an exemplary method 300 for validating scheduled avail tones according to the exemplary embodiments. Specifically, the method 300 describes a process by which the validating application 240 of the avail comparator 125 determines whether an avail tone inserted in a television broadcast transmitted by the broadcaster 105 has properly triggered based upon the corresponding automation playlist 130. The method 300 will be described with regard to the broadcast system 100 of FIG. 1 and the avail comparator 125 of FIG. 2.

In step 305, the avail comparator 125 receives the automation playlist 130. As discussed above, the automation playlist 130 may correspond to a television broadcast transmitted by the broadcaster 105. The automation playlist 130 may also be received from any source such as the broadcaster 105, a manual entry, a further component, etc. In step 310, the avail comparator 125 determines a scheduling of the avail tones based upon the automation playlist 130. That is, the avail comparator 125 determines when the scheduled avail tones are expected to be triggered in the television broadcast.

In step 315, the avail comparator 125 receives a return feed from the communication medium 110. As discussed above, the television broadcast may be transmitted from the broadcaster 105 to the distributor 115 via the communication medium 110 so that the distributor 115 may re-transmit the television broadcast to the consumer 120. The television broadcast may also be returned to the broadcaster 105 for monitoring purposes. Additionally, the avail comparator 125 may receive the return feed from the communication medium 110.

In step 320, the avail comparator 125 selects a next scheduled avail tone to be triggered in the television broadcast as indicated in the automation playlist 130. For example, the television broadcast may be a 30 minute program in which there are three commercial breaks lasting 2 minutes each, the first commercial break starting at a first time, the second commercial break starting at a second time subsequent to the first time, and the third commercial break starting at a third time subsequent to the second time. The first commercial break may include 4 commercials, each lasting 30 seconds. The automation playlist 130 may indicate that the first commercial slot (starting at time 0 of the first commercial break) and the third commercial slot (starting at time 60 seconds of the first commercial break) are available time slots which may be replaced with programming segments selected by the distributor 115. Accordingly, these commercial slots may have already had the avail tones inserted therein in the television broadcast. In step 320, in a first iteration of the method 300, the avail comparator 125 may select this first commercial break at the first commercial slot.

In step 325, the validating application 240 determines whether the avail tone was properly triggered in the television broadcast based upon the return feed that was received. As discussed above, the automation playlist 130 may provide a basis to generate a signaling of the scheduled avail tone playing out. Accordingly, this signaling may represent the presence of the avail tone that is expected in the corresponding spot in the return feed of the television broadcast. The return feed may provide a notification of whether the avail tone has been triggered in the television broadcast. Thus, if the notification is received, this may be indicative of the avail tone triggering whereas an absence of the notification may be indicative that the avail tone was not triggered. Also discussed above, the windows of opportunity may be used in determining whether the corresponding signaling has been received (e.g., outside the window or missed from within the window).

If the notification of the avail tone triggering is received, the validating application 240 continues the method 300 to step 340. However, if the notification of the avail tone triggering is not received, the validating application 240 continues the method 300 to step 330. In step 330, the validating application determines whether a time from which the signaling for the automation playlist 130 has gone beyond a predetermined time. As discussed above, this predetermined time may represent a window in which the notification may be received to satisfy the signaling indication. If the predetermined time has not yet been reached, the validating application 240 may return the method 300 to step 325. However, if the predetermined time has elapsed, the validating application 240 may continue the method 300 to step 335. In step 335, the validating application 240 generates an alert corresponding to the avail tone not properly triggering. Subsequently, the validating application 240 continues the method 300 to step 340.

In step 340, the validating application 240 may log the event of the activity performed. For example, if the avail tone was triggered, this event may be logged. In another example, if the avail tone was not triggered, this even may also be logged. Accordingly, the logging functionality may be performed for this automation playlist 130 corresponding to the television broadcast from the broadcaster 105.

In step 345, the validating application 240 determines whether any further avail tones are expected to be triggered in the television broadcast. As discussed above, the first commercial break may trigger another avail tone in the third commercial slot. Accordingly, the validating application 240 may return the method 300 to step 320. This process may continue until each avail tone has been analyzed as to whether it has properly triggered. That is, the log functionality may indicate whether every scheduled avail tone was properly triggered in the television broadcast as the automation playlist 140 may provide a corresponding signaling indicating an expected avail tone triggering.

It should be noted that the method 300 may loop continuously as a subsequent broadcast is scheduled following the current broadcast. Thus, each iteration may be punctuated by new incoming playlists as well as new incoming return feed data in determining whether scheduled avail tones are played out throughout a constant broadcast.

The exemplary embodiments provide a device, system, and method of validating whether a scheduled avail tone is triggered in a broadcast. The scheduling of the avail tones in the broadcast may be predetermined and provided as a basis for which the triggering in the broadcast has occurred. Specifically, an automation playlist indicating the scheduled avail tones may be provided. A return feed of the broadcast may also be provided that includes notifications of whether the avail tones have properly triggered in the broadcast. Accordingly, the exemplary embodiments enable a determination of when a scheduled avail tone has properly triggered or an issue is present that prevents the triggering of the scheduled avail tone.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at an avail comparator:
receiving an automation playlist indicating at least one scheduled avail tone configured to be included in a broadcast;
receiving a feed corresponding to the broadcast;
receiving a signaling for each of the at least one scheduled avail tone based upon the automation playlist; and
determining whether the at least one scheduled avail tone was triggered in the broadcast based upon the corresponding signaling.

2. The method of claim 1, further comprising:
receiving a notification in the feed indicative of the at least one scheduled avail tone having triggered.

3. The method of claim 2, further comprising:
determining whether a predetermined time has elapsed from receiving the signaling;
determining a presence of the notification when the notification is received within the predetermined time; and
determining an absence of the notification when the predetermined time has elapsed.

4. The method of claim 3, further comprising:
generating an alert indicating the absence.

5. The method of claim 1, wherein the signaling is generated based upon one of a signal playout on an on-air channel, scraping the automation playlist for signal playout by an external system, scraping the automation playlist for signal playout by the avail comparator, and a combination thereof.

6. The method of claim 1, wherein the feed includes a plurality of feeds that are aggregated.

7. The method of claim 3, further comprising:
generating a log including events corresponding to the presence of the notification and the absence of the notification corresponding to each of the at least one avail tones.

8. The method of claim 7, wherein the log is for a configurable amount of time, the log being searchable by filtering for a date range, a channel, and an avail tone status within the configurable amount of time.

9. The method of claim 1, wherein the avail tone is one of a cue tone, a Society of Cable Television Engineers (SCTE) 104 generated event, an application for a general purpose interface (GPI) signaling, an application for an AC3 encoder, an application for active format description (AFD) signaling, and an application for a V-Chip signaling.

10. The method of claim 1, wherein the broadcast is a television broadcast and the feed is a return feed.

11. An avail comparator, comprising:
a transceiver configured to establish a connection to a broadcast system; and
a processor configured to receive an automation playlist indicating at least one scheduled avail tone configured to be included in a broadcast, the processor configured to receive a feed corresponding to the broadcast, the processor configured to receive a signaling for each of the at least one scheduled avail tone based upon the automation playlist, the processor configured to determine whether the at least one scheduled avail tone was triggered in the broadcast based upon the corresponding signaling.

12. The avail comparator of claim 11, wherein the processor is further configured to receive a notification in the feed indicative of the at least one scheduled avail tone having triggered.

13. The avail comparator of claim 12, wherein the processor is further configured to determine whether a predetermined time has elapsed from receiving the signaling, determine a presence of the notification when the notification is received within the predetermined time, and determine an absence of the notification when the predetermined time has elapsed.

14. The avail comparator of claim 13, wherein the processor is further configured to generate an alert indicating the absence.

15. The avail comparator of claim 11, wherein the signaling is generated based upon one of a signal playout on an on-air channel, scraping the automation playlist for signal playout by an external system, scraping the automation playlist for signal playout by the avail comparator, and a combination thereof.

16. The avail comparator of claim 11, wherein the feed includes a plurality of feeds that are aggregated.

17. The avail comparator of claim 13, wherein the processor is further configured to generate a log including events corresponding to the presence of the notification and the absence of the notification corresponding to each of the at least one avail tones.

18. The avail comparator of claim 17, wherein the log is for a configurable amount of time, the log being searchable by filtering for a date range, a channel, and an avail tone status within the configurable amount of time.

19. The avail comparator of claim 11, wherein the avail tone is one of a cue tone, a Society of Cable Television Engineers (SCTE) 104 generated event, an application for a general purpose interface (GPI) signaling, an application for an AC3 encoder, an application for active format description (AFD) signaling, and an application for a V-Chip signaling.

20. A non-transitory computer readable storage medium with an executable program stored thereon, wherein the program instructs a microprocessor to perform operations comprising:

receiving an automation playlist indicating at least one scheduled avail tone configured to be included in a broadcast;

receiving a feed corresponding to the broadcast;

receiving a signaling for each of the at least one scheduled avail tone based upon the automation playlist; and determining whether the at least one scheduled avail tone was triggered in the broadcast based upon the corresponding signaling.

* * * * *